United States Patent [19]

Jacobson

[11] 4,306,117
[45] Dec. 15, 1981

[54] REMOTE RECORDING OF NEW OUTGOING ANNOUNCEMENT IN A TELEPHONE ANSWERING DEVICE

[76] Inventor: Sava Jacobson, 8130 Orion St., Van Nuys, Calif. 91406

[21] Appl. No.: 116,099

[22] Filed: Jan. 28, 1980

[51] Int. Cl.³ ............................................. H04M 1/64
[52] U.S. Cl. ................................... 179/6.1; 179/6.11; 360/71; 328/206; 330/252
[58] Field of Search .............. 179/6 E, 6 R, 6 C, 6.10, 179/6.03, 6.07, 6.09, 6.11, 6.17; 360/71; 328/206; 330/252, 259, 260

[56] References Cited

U.S. PATENT DOCUMENTS

| | | | |
|---|---|---|---|
| 3,780,226 | 12/1973 | Jacobson | 179/6 R |
| 4,104,487 | 8/1978 | Jacobson | 179/6 E |
| 4,119,801 | 10/1978 | Jacobson | 179/6 R |
| 4,126,763 | 11/1978 | Jacobson | 179/6 E |
| 4,197,426 | 4/1980 | Jacobson | 179/6 R |
| 4,201,888 | 5/1980 | Jacobson | 179/6 E |

FOREIGN PATENT DOCUMENTS 40-27442 12/1965 Japan ................................ 179/6 E

*Primary Examiner*—Alan Faber
*Attorney, Agent, or Firm*—Spensley, Horn, Jubas & Lubitz

[57] ABSTRACT

In this telephone answering device, a new outgoing announcement can be recorded under remote control via the telephone line. To accomplish this, the user calls his own number. During the incoming message record portion of the resultant answering cycle, the user sends a coded signal over the telephone line. As a result, the message tape is stopped, and the announcement tape is driven. As the user then speaks the new announcement, it is amplified and recorded onto the announcement tape instead of onto the message tape. Switching circuitry is minimized since the amplifier already is conditioned for operation in the incoming message record mode. In addition, the prior announcement is erased, and generation of the audio tone which normally occurs at the end of the outgoing announcement is inhibited.

When the new announcement has been recorded, the device automatically returns to the announcement transmit portion of the answering cycle. The new message is played out for verification. The device completes the answering cycle and shuts down in readiness for the next call.

Another answering device is disclosed in which the outgoing announcement is contained in digital format in a read only memory. When a call is answered, the memory is read out and the contents are converted to audio by a speech synthesizer or a microprocessor that is programmed to decode speech compression encoded signals.

10 Claims, 1 Drawing Figure

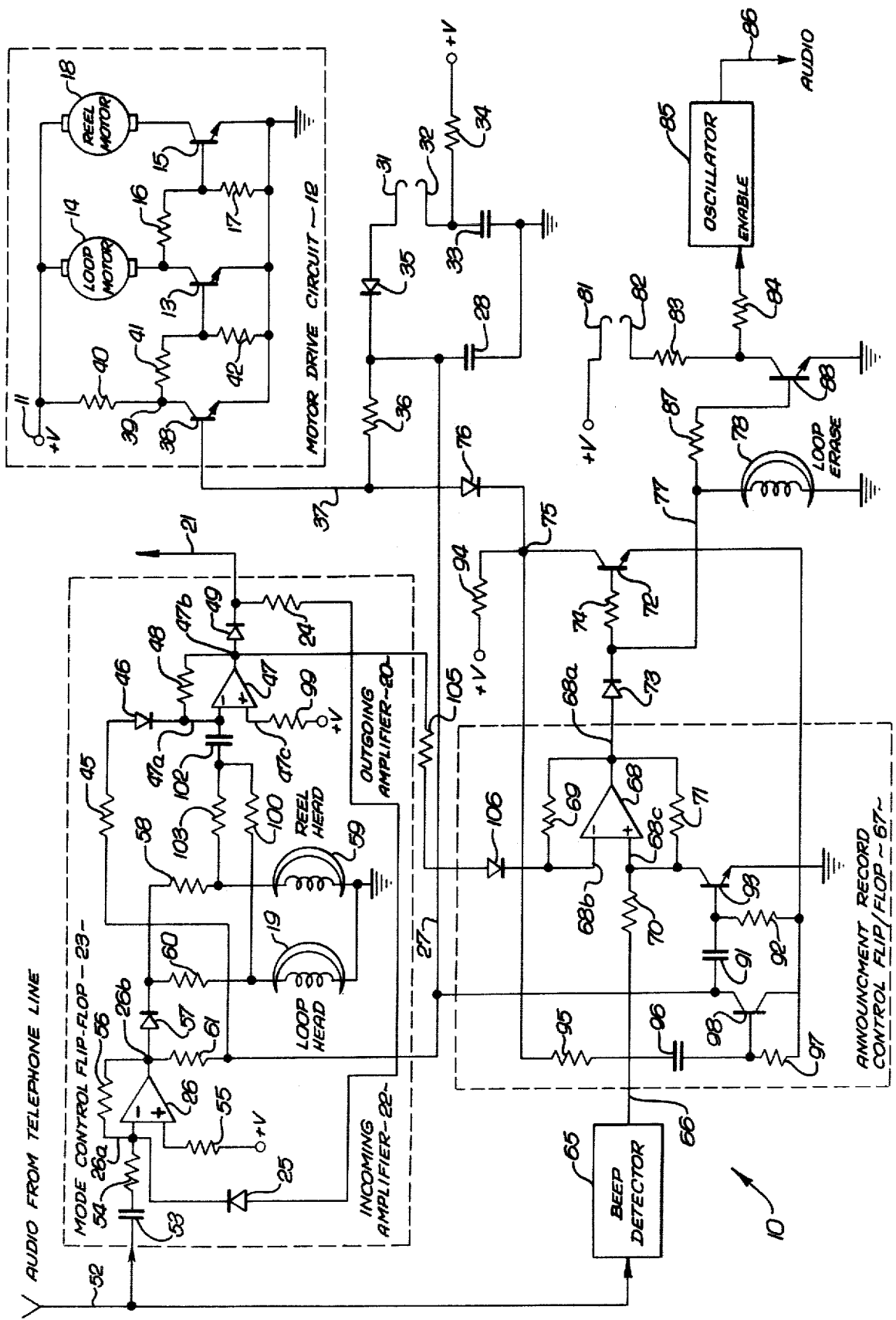

REMOTE RECORDING OF NEW OUTGOING ANNOUNCEMENT IN A TELEPHONE ANSWERING DEVICE

BACKGROUND OF THE INVENTION

1. Field of the Invention

The present invention relates to a telephone answering device in which the user can record a new outgoing announcement under remote control via the telephone line.

2. Description of the Prior Art

A conventional telephone answering device responds to an incoming call by initially transmitting a prerecorded outgoing announcement. This announcement typically informs the caller that the user is out, and invites the caller to leave a message which is then automatically recorded. The user later can retrieve these messages by playback of the message tape, either at the device itself when the user returns to his home or office, or if the device is so equipped, by remote controlled playout over the telephone line.

The usefulness of such a device is enhanced if the outgoing announcement can easily be changed. For example, if the user is leaving for a certain length of time, he can record a new answering message indicating the time or date when he still return. Altenatively, the new message may state that the user is at another location, and may give the telephone number for that place so that the user can be reached immediately. As another example, the user can leave a specific message intended for a certain person whose call is expected.

Most prior art telephone answering devices do have built-in facilitates for recording a new outgoing announcement. For example, the answering apparatus disclosed in the inventor's U.S.Pat. No. 3,780,226 includes facilities for recording a new message on the outgoing announcement tape loop using the local telephone handset as the microphone. Other prior art devices utilize a built-in microphone for this purpose. However, such prior art devices require that recording of the new message be carried out where the answering apparatus is located. By contrast, an object of the present invention is to provide a telephone answering device in which a new outgoing announcement can be recorded over the telephone line by remote control from a distant location.

The present invention thus permits the user to call back to his home or office and change the outgoing announcement, for example, to indicate his present whereabouts and the telephone number where he can presently be reached. The invention is particularly useful in a telphone answering device which also is capable of remote controlled playout of previously recorded messages. In that instance, e.g., the intitial outgoing announcement may inform the caller that if he leaves a message requesting additional information, he should call back at a later time for an answer. Meanwhile, the user can obtain this message by remote controlled playout, and then employ the present invention to record a new outgoing announcement which contains an answer to the question posed by the previous caller. The caller will receive this answer when he later again calls the user's number.

One prior art telephone answering device in which the outgoing announcement can be changed from a remote location is shown in the Japanese Pat. No. 40-27442 to Yasuma Mata. In that apparatus, a large number of relays are used to control the operational mode. For remote recording of a new outgoing announcement, the user calls his own number. The device answers the call. During announcement playout, the user sends a first beep tone which sets a latching circuit that in turn energizes a first set of relays which condition the device for recordation. When a conductive strip on the outgoing announcement tape loop next shorts a pair of contacts, a second latch circuit is set which energizes a second set of relays. These enable continued tape loop motion, and connect the output of a single amplifier to the tape loop record head. The user then speaks the new announcement, which is recorded on that tape loop.

An object of the present invention is to facilitate the remote controlled recordation of a new outgoing announcement in a telephone answering device, without the use of relays. A further object is to implement this function by utilizing circuitry already present in the telephone answering device, thereby minimizing the number of additional components required and reducing the cost. Accordingly, another object is to minimize the latching and control circuitry necessary to enable both remote controlled recordation of a new outgoing message, and automatic playback of that message to verify its correctness. When implemented in a telephone answering device with remote controlled playout of recorded incoming messages, the same remote control signal or "beep" tone can be used at different times during the answering cycle to condition either remote playout or new announcement recordation.

A different object of the present invention is to provide a telephone answering device in which the outgoing announcement is stored in digital format in a programmable read only memory. In prior art telephone answering devices, the outgoing announcement is stored on a recording medium which requires a mechanical driving arrangement. By storing the outgoing announcement digitally in a read only memory (ROM) and using appropriate readout and speech synthesizer circuitry, the need for a mechanical drive system is completely eliminated. Similarly, time compression encoding of the announcement may be used, together with a microprocessor to decode the compressed speech. The ROM and synthesizer or speech compression decoder all may be implemented in a single integrated circuit chip. So configured, the cost may actually be less than that of a mechanical drive system, with none of the shortcomings inherent in a mechanical device which is subject to misadjustment or malfunction as a result of repeated wear.

SUMMARY OF THE INVENTION

These and other objectives are achieved by providing a telephone answering device in which a new outgoing announcement can be recorded from a remote location. The device includes a control flip-flop which responds to the receipt of a coded signal such as a "beep" tone, that is transmitted over the telephone line during the incoming message record portion of the answering cycle. At this time, incoming audio normally is being amplified in the answering device and recorded on the incoming message tape. When the remote control signal sets the flip-flop, the incoming message tape drive mechanism is disabled, and the outgoing announcement tape drive mechanism is energized. The incoming audio, namely the new announcement which is being spoken by the user over the telephone line, then is amplified by the same incoming amplifier but recorded on the outgoing message tape.

When the end of the outgoing announcement tape is reached, an appropriate mechanism terminates the recording cycle. For example, an electrically conductive strip on the announcement tape may short a pair of contacts when an end point on the tape is reached. Closure of the contacts causes the answering device to revert into an operational mode in which the newly recorded outgoing announcement is sent back over the telephone line for verification by the user. This is accomplished by resetting the remote announcement record control flip-flop back to its initial state, while continuing to drive the outgoing announcement tape. When the control flip-flop is reset, the incoming amplifier is disable, and an outgoing amplifier is enabled to transmit the new message from the outgoing announcement tape. Once transmission is complete, the device transfers back to the incoming mode, the answering cycle is completed, and the device shuts off in readiness for answering the next call.

In another embodiment, production of the outgoing announcement is implemented without mechanical means. For example, the outgoing announcement may be stored in a digital read only memory, the contents of which is accessed sequentially at an appropriate rate and used to control a speech synthesizer. Alternatively, by using time compression encoding of speech, with appropriate microprocessor controlled decoding, the outgoing announcement can be produced completely electronically.

BRIEF DESCRIPTION OF THE DRAWINGS

A detailed description of the drawings will be made with reference to the accompanying drawings wherein:

FIG. 1 is an electrical schematic diagram of a system for enabling the remote controlled recording of a new outgoing announcement in a telephone answering device.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

The inventive remote controlled outgoing announcement recording system 10 advantageously is incorporated in a telephone answering device of the type in which an outgoing announcement is recorded on a first recording medium such a magnetic tape loop, and wherein incoming messages are recorded on a separate recording medium such as a reel of magnetic tape. The invention may be employed with the telephone answering devices shown in the inventor's U.S. Pat Nos. 4,104,487 or 4,126,763 or U.S. Pat. applications, Ser. Nos. 879,279 filed Feb. 21, 1978 now U.S. Pat. No. 4,197,426 and 941,282 filed Sept. 11, 1978 now U.S. Pat. No. 4,201,888. Alternatively, the present invention may be used with other answering devices, including those which store the outgoing announcement and/or the incoming messages on magnetic tape cassettes.

When a call is answered, a regulated voltage $+V$ is supplied via a terminal 11 to a motor drive circuit 12 which connects this voltage via a transistor 13 to the drive motor 14 for the outgoing announcement tape loop. The manner in which the transistor 13 is turned on at the beginning of the answering cycle is described in the inventor's above mentioned U.S. Pat. No. 4,126,763 and the U.S. Pat. Nos. 4,197,426 and 4,201,888. Since the transistor 13 is on, the base of a transistor 15 is clamped near ground potential via a pair of resistors 16, 17. This keeps the transistor 15 off, so that no power is supplied to the motor 18 which drives the incoming message record tape.

As the outgoing announcement tape loop is driven by the motor 14, the announcement is picked up by a loop record/playback head 19, amplified by an outgoing amplifier 20, and transmitted to the telephone line via a line 21. In the embodiment shown, the outgoing amplifier 20 is interconnected with an incoming amplifier 22 so that these two audio amplifiers together function as a mode control flip-flop 23, in the manner described in the inventor's U.S. Pat. Nos. 4,126,763 and 4,197,426 and 4,201,888. During the transmission of the outgoing announcement, the audio on the line 21 is superimposed on a dc bias of approximately $+V/2$. This dc bias is fed back via a resistor 24 and a diode 25 to the inverting ($-$) input terminal 26a of an operational amplifier 26. As a result, the incoming amplifier 22 is disabled so long as the outgoing amplifier 20 is on. Accordingly, a control line 27 connected to the amplifier 22 output is at ground potential, and a capacitor 28 is discharged.

While the outgoing announcement is being transmitted, a pair of contacts 31, 32 are open circuited. As a result a capacitor 33 will be charged to the $+V$ level via a resistor 34. Advantageously, the capacitor 33 has a considerably greater capacitance (typically in the order of ten-to-one) than the capacitor 28. At the end of announcement transmission, a conductive strip on the announcement tape loop shorts the contacts 31, 32 so that the positive charge on the capacitor 33 will immediately charge the capacitor 28 via a diode 35. The resultant positive voltage on the line 27 causes the motor drive circuit 12 to turn off the loop motor 14 and turn on the reel motor 18, and causes the incoming amplifier 22 to go on.

In the motor drive circuit 12, the positive signal on the line 27 is applied via a resistor 36 and a line 37 to the base of a transistor 38, turning that transistor on. This clamps to ground the node 39 of a voltage divider consisting of three resistors 40, 41, 42 which previously had been supplying positive bias to the base of the transistor 13. As a result, the transistor 13 goes off, thereby disconnecting power from the loop motor 14. The resultant positive bias supplied via the resistors 16 and 17 turns on the transistor 15, thereby supplying power to the motor 18 which now begins to drive the incoming message tape.

The positive voltage on the line 27 also is supplied via a resistor 45 and a diode 46 to the inverting ($-$) input 47a of an operational amplifier 47 which has a feedback resistor 48. As a result, the amplifier output terminal 47b is forced to a low potential, effectively turning off the outgoing amplifier 20. Audio is no longer supplied from the amplifier 20 via a diode 49 to the line 21. Since the $+V/2$ bias is no longer present at the amplifier output terminal 47b, the corresponding bias is removed from the amplifier 26 input terminal 26a, so that the incoming amplifier 22 now is enabled. A caller's message now can be recorded onto the incoming message tape.

To this end, audio from the telephone line is supplied to the incoming amplifier 22 via a line 52, a capacitor 53, and a resistor 54 to the input terminal 26a of the amplifier 26. The non-inverting (+) input of the amplifier 26 is connected to +V potential via a resistor 55, and the amplifier 26 is provided with a feedback resistor 56. As a result, the amplified incoming audio present at the amplifier output terminal 26b is superimposed on a dc bias of approximately +V/2. The amplified audio is supplied via a diode 57and a resistor 58 to a reel record/playback head 59 for recordation onto the incoming message tape. The audio from the amplifier 26 also is supplied via a resistor 60 to the loop record/playback head 19. However, no recording onto the announcement tape loop takes place since that tape loop is then not moving. The dc bias present at the terminal 26b is applied to the inverting (−) input terminal 47a of the amplifier 47 via a resistor 45 and the diode 46. This positive bias disables the outgoing amplifier 20 so long as the incoming amplifier 22 is on.

It is in this incoming message record mode that the system 10 can be conditioned to record a new outgoing announcement. To accomplish this, while the answering device is in the incoming message record mode, the user transmits an appropriate coded signal over the telephone line. This may consist of a "beep" tone of a certain frequency that is generated by a hand-held oscillator which the user places against the telephone mouthpiece. The beep tone is sensed by an appropriate detector 65 which then produces an output pulse on the line 66 that causes an announcement record control flip-flop 67 to change state. Recording of the new outgoing announcement is enabled when this occurs.

The control flip-flop 67 is of the type generally described in the inventor's U.S. Pat. Nos. 4,119,801 and 4,126,763 and 4,197,426 and 4,201,888. It employs an operational amplifier 68 connected so that the output terminal 68a can assume one of two stable states. During the normal answering cycle, the output terminal 68a is maintained at a low potential by feedback via a resistor 69 to the inverting (−) input terminal 68b. However, when a beep tone first is detected while the answering device is in the incoming message record mode, the flip-flop 67 is set to a second stable state by the pulse on the line 66 which is supplied via a resistor 70 to the non-inverting (+) amplifier input terminal 68c. This positive pulse causes the amplifier output terminal 68a to rise to a potential near the +V power source level. The amplifier 68 is maintained in this high output state by feedback via a resistor 71. The values of the resistors 69 and 71 are selected so that more current will flow through the resistor 71 to the non-inverting (+) input terminal 68c than through the resistor 69.

The setting of the flip-flop 67 causes several actions to occur which enable the recording from a remote location of a new outgoing announcement. First, the reel drive motor 18 is turned off and the loop motor is turned on. To accomplish this, the high output from the flip-flop 67 turns on a transistor 72 to which the terminal 68a is connected via a diode 73 and a resistor 74. As a result, the collector node 75 of the transistor 72 is clamped to ground, thereby effectively clamping to ground the base of the transistor 38 via a diode 76. The transistor 38 goes off, so that the node 39 rises toward +V, thereby turning on the transistor 13 and connecting power to the loop motor 14. Concurrently, the transistor 15 is turned off so that the reel motor 18 is deenergized.

The announcement tape loop now is moving, and the incoming message tape is stopped. The incoming amplifier 22 remains on, so that now the new announcement which is spoken over the telephone by the user will be recorded onto the tape loop via the loop record/playback head 19. No recording will occur onto the incoming message tape, which is now stopped. During this recording operation, the high signal on the terminal 68a is supplied via the diode 73 and a line 77 to the loop erase head 78. This accomplishes erasure of the old announcement as the new one is being recorded.

Another function that is performed by setting the flip-flop 67 is to inhibit production of the tone which normally is transmitted to the calling party at the end of the outgoing announcement. When, during the normal answering cycle, the announcement tape loop nears the end of its travel, the conductive strip on the loop shorts together a second pair of contacts 81, 82. This provides via a pair of resistors 83, 84 a positive voltage +V which enables an oscillator 85 to generate an audio tone. This tone is transmitted via a line 86 to the telephone line, to inform a caller that the outgoing announcement is over and that he may now leave a message which will be recorded.

It is desirable to inhibit operation of the oscillator 85 when a new announcement is being recorded, so as to prevent the tone itself from being recorded on the outgoing announcement tape. This inhibit function is accomplished by supplying the high signal from the output terminal 68a via the diode 73 and a resistor 87 to the base of a transistor 88. The transistor 88 turns on, clamping the junction of the resistors 83 and 84 to ground. As a result, when at the end of new announcement recording the conductive strip shorts the contacts 81 and 82, no voltage will be supplied to the enable input of the oscillator 85. No tone is generated.

The user can begin the recording of a new outgoing announcement as soon as he transmits the beep tone to set the flip-flop 67. There is no delay, since during the incoming message record cycle (when the beep tone must be sounded), the tape loop is at the correct start of announcement position, with the conductive strip shorting the contacts 31 and 32. After the new announcement is recorded, when the tape loop again reaches the start position, the conductive strip once again will short the contacts 31 and 32. This in turn will reset the flip-flop 67 and condition the system 10 immediately to transmit over the telephone line the new announcement which has just been recorded. The user then is able to verify that the announcement is correct.

To this end, while the new announcement is being recorded and the contacts 31, 32 are open-circuited, the capacitor 33 again charges to the +V potential. The capacitor 28 also is charged, but to the significantly lower dc bias level of less than +V/2 that is present on the line 27. When the tape loop makes a complete revolution, so that the time for recording the new announcement is over, the conductive strip once again shorts the contacts 31, 32. The considerable charge from the capacitor 33 immediately is "dumped" across the much smaller capacitor 28, thereby producing a substantial positive transient on the line 27.

This transient is coupled via a capacitor 91 to the base of a transistor 93, which base is connected to ground via a resistor 92. The transient momentarily turns on the transistor 93. This clamps the non-inverting (+) amplifier input 68c to ground, as a result of which the feedback via the resistor 69 forces the amplifier 68 into the low output state. In other words, the flip-flop 67 is reset to the original state in which the potential at the terminal 68a is low. This state is maintained even after the positive transient on the line 27 terminates.

The mode control flip-flip 23 now has to be reset so as to turn on the outgoing amplifier 20 and turn off the incoming amplifier 22. However, the loop motor 14 remains energized so that the new announcement can be played back.

Resetting of the flip-flop 23 is accomplished as follows. When the flip-flop 67 assumes the low output state, the transistor 72 goes off. As a result, the node 75 begins to rise toward the +V potential level. Current is supplied via a pair of resistors 94, 95 to charge a capacitor 96 that is connected to ground via a resistor 97 and to the base of a transistor 98. The charging time constant for the capacitor 96 is chosen to be fairly long, typically one second. Accordingly, during this charging time the transistor 98 is held on, thereby clamping to ground the line 27 for a period of time after the occurrence of the positive pulse on the line 27 which reset the flip-flop 67. The line 27 is held at ground potential for a sufficient time duration to allow the outgoing amplifier 20 to turn on. This happens since when the line 27 is clamped to ground, the positive dc bias is removed from the amplifier 47 inverting (−) input terminal 47a. A positive voltage supplied via a resistor 99 to the non-inverting (+) input terminal 47c then drives the output terminal 47b high, turning on the outgoing amplifier 20. The resultant dc bias at the terminal 47b turns off the incoming amplifier 22 in the manner described above. The resultant low signal on the line 27 is supplied via the resistor 36 to keep the transistor 38 off. As a result, the loop motor 14 remains on and the reel motor 18 remains off.

Thus the system 10 now is conditioned to play back the newly recorded announcement. Audio picked up from the tape loop by the head 19 is provided via a resistor 100 and a capacitor 102 to the amplifier 47. The amplified output is supplied to the telephone line via the line 21. The reel record/playback head 59 also is connected via a resistor 103 to the amplifier 47. However, no audio is picked up by the head 59 since the incoming message tape now is stopped. The high dc bias at the terminal 47b also is supplied via a resistor 105 and a diode 106 to the inverting (−) input terminal of the amplifier 68.

It should be apparent that as as the newly recorded outgoing announcement is being played back to the user, the telephone answering device and the system 10 are operating in exactly the normal outgoing announcement mode of an answering cycle, as if the device had just answered the call. Thus if the user is satisfied with the new announcement he does nothing more. The answering device completes the answering cycle and shuts down in readiness for receiving the next call. On the other hand, if the user is not satisfied with the new announcement, he can wait until the answering device switches once again to the incoming message record mode, transmit the beep tone once more, and thereby condition the answering device for recording the new announcement once again.

Advantageously, the system disclosed herein for the remote control of a new outgoing announcement may be incorporated into a telephone answering device in which previously recorded incoming messages may be played out under remote control. Such devices are disclosed e.g., in the inventor's U.S. Pat. Nos. 4,104,487 and 4,126,763 and 4,197,426 and 4,201,888.

By combining such remote controlled playout with the present invention, the same control signal or "beep" tone source may be used to condition either remote message playback or remote recording of the new outgoing announcement. If the "beep" tone is transmitted while the answering device is sending out the answering announcement, the device will be conditioned for automatic playout of previously recorded incoming messages. If the "beep" tone is transmitted during the incoming message record portion of the answering cycle, the device will be conditioned for the remote recording of a new outgoing announcement.

Various modifications may be made to the system disclosed herein. For example, in FIG. 1 the loop head 19 and the reel head 59 both are connected directly to the output of the operational amplifier 26 in the incoming amplifier circuit 22. The invention is not so limited, however, and other arrangements could be used. For example, separate emitter followers could be inserted between the amplifier 26 output and the respective loop and reel heads 19 and 59. Similarly, although both of these heads 19 and 59 are directly connected to the input of the amplifier 47 in the embodiment of FIG. 1, the invention is not so limited. Separate preamplifiers could be inserted in the lines connecting these respective heads 19 and 59 to the amplifier 47 input.

As yet another alternative, it may be desirable to provide some type of audio response signal to the user to confirm that the system 10 has transferred into the remote announcement recording mode. To this end, the output of the control flip-flop 67 may be utilized to momentarily turn on a tone generator or oscillator when the signal on the line 68a initially goes high. The resultant generated tone then could be transmitted to the user via the telephone line to confirm that the system 10 is now conditioned for recording of a new announcement. The tone would thus inform the user that he should now start speaking the new announcement which he desires to record.

In an alternative embodiment, not shown in the drawings, the outgoing announcement of a telephone answering device is provided totally electronically. A read only memory (ROM) or programmable read only memory (PROM) is used to store the outgoing announcement in digital format. At the beginning of the answering cycle, detection of the ring signal causes sequential readout of the stored memory, which is then converted to audio by an appropriate microprocessor or speech synthesizer. The mechanical drive mechanisms associated with prior art announcement recording mediums are totally eliminated.

Speech compression techniques may be employed, with time compression encoding being used to format the announcement for storage in the ROM or PROM. A preprogrammed microprocessor then would be used for speech compression decoding and resultant audio production.

Alternatively, the stored data may comprise instruction words for directing a speech synthesizer to produce the requisite message. In either case, the memory and microprocessor or speech synthesizer all may be implemented in an integrated circuit.

A brief announcement may be stored in the ROM or PROM. This may simply say that the call is being answered automatically, and request the caller to leave a message. In more expensive units, longer announcements may be available, or a plurality of different announcements may be stored in the same memory, for switch selection by the user.

I claim:

1. In a telephone answering device of the type wherein a recorded outgoing announcement is transmitted from an announcement tape to the telephone line during an announcement transmit portion of the answering cycle and a message incoming from the telephone line is recorded on a message tape during a subsequent incoming message record portion of the answering cycle, a system for recording a new outgoing announcement under remote control via the telephone line, comprising:

signal responsive means for detecting the receipt of a coded signal transmitted over the telephone line to said answering device during said incoming message record portion and for providing an enable signal in response to such detection, and recording transfer means, operative during said incoming message record portion and cooperating with the normal circuitry for recording incoming messages onto said message tape, for transferring the recording operation from recording onto said message tape to recording onto said announcement tape upon occurrence of said enable signal.

2. A device according to claim 1 further comprising: remote playout control means, responsive to the same coded signal when transmitted over the telephone line to said answering device during said announcement transmit portion of the answering cycle, for transferring the operation of said device from transmission of the outgoing announcement to transmission of previously recorded incoming messages.

3. In a telephone answering device of the type wherein a recorded outgoing announcement is transmitted from an announcement tape to the telephone line during an announcement transmit portion of the answering cycle and a message incoming from the telephone line is recorded on a message tape during a subsequent incoming message record portion of the answering cycle, a system for recording a new outgoing announcement under remote control via the telephone line, comprising:

recording transfer means, responsive to a coded signal transmitted over the telephone line to said answering device during said incoming message record portion, and cooperating with the normal circuitry for recording incoming messages onto said message tape, for transferring the recording operation from recording onto said message tape to recording onto said announcement tape, and wherein said recording transfer means comprises:

a motor drive circuit for alternately enabling one and disabling the other of the respective drive mechanisms for said message tape and said announcement tape, audio received from the telephone line being amplified by a first amplifier the output of which is effectively, concurrently connected to the record heads for both said announcement tape and said message tape, amplified audio being supplied simultaneously to both such heads but recording occurring only on that one of the announcement and message tapes which then is being driven, bistable circuit means for causing said motor drive circuit means to disable said message tape drive mechanism and to enable said announcement tape drive mechanism in response to receipt of said coded signal during said incoming message record portion, and erase means, also enabled by said bistable circuit means, for concurrently erasing the previously recorded outgoing announcement.

4. A system according to claim 3 further comprising: end of announcement means, operated when said announcement tape has been driven for a certain time or through a certain distance, for resetting said bistable circuit means, thereby disabling said erase means, while said motor drive circuit means continues to disable said message tape drive mechanism and enable said announcement tape drive mechanism, and for disabling said first amplifier and enabling a second amplifier which amplifies audio picked up from said announcement tape for transmission over the telephone line, said answering device thereby being returned to the normal announcement transmit portion of the answering cycle and playing out over the telephone line the newly recorded announcement.

5. A device according to claim 3 further comprising: tone response means, also enabled by said bistable circuit means, for momentarily transmitting over the telephone line a tone signal indicating that said recording transfer means has conditioned said answering device for recording of a new announcement.

6. In a telephone answering device of the type wherein a recorded outgoing announcement is transmitted from an announcement tape to the telephone line during an announcement transmit portion of the answering cycle and a message incoming from the telephone line is recorded on a message tape during a subsequent incoming message record portion of the answering cycle, a system for recording a new outgoing announcement under remote control via the telephone line, comprising:

an incoming amplifier connected to amplify audio incoming from the telephone line, said incoming amplifier being disabled during the announcement transmit portion and enabled during the incoming message record portion of of the answering cycle, the audio output of said incoming amplifier being supplied to the record/playback heads for both said announcement tape and said message tape, and motor control means for stopping movement of said incoming message tape and starting movement of said announcement tape, in response to actuation by the receipt of a coded signal transmitted over the telephone line to said answering device during said incoming message record portion, while maintaining said incoming amplifier in the enabled condition so that a new announcement then received over the telephone line will be amplified by said incoming amplifier and recorded on said announcement tape via the record/playback head for said announcement tape.

7. A system according to claim 6 further comprising: a bistable circuit connected to be switched by receipt of said coded signal from a first state in which said telephone answering device performs a normal answering cycle to a second state in which recording of a new outgoing announcement is conditioned, said motor control means being cooperatively connected to said flip-flop so as to be actuated when said control flip-flop is switched to said second state, and erase means, also actuated when said flip-flop switches to said second state, for erasing the previous outgoing announcement on said announcement tape as said new announcement is recorded thereon.

8. A system according to claim 7 further comprising:

an outgoing amplifier having audio from both of said record/playback heads supplied to the input thereof, the audio output of said outgoing amplifier being transmitted to said telephone line, said incoming and outgoing amplifiers being interconnected so that when one is enabled the other is disabled, and switching means, operative after said announcement tape has travelled a certain distance or time and the new announcement has been recorded thereon, for returning said bistable circuit to said first state and for disabling said incoming amplifier and enabling said outgoing amplifier, whereby the telephone answering device is returned to the announcement transmit portion of the answering cycle and the new announcement is played out to the telephone line.

9. A system according to claim 8 wherein:

the output of said bistable circuit is connected to turn on a first transistor wherein said bistable circuit is in said second state, turn-on of said first transistor causing said motor control means to stop movement of said incoming message tape and start movement of said announcement tape, said switching means providing a pulse which resets said bistable circuit to said first state, thereby turning off said first transistor, turn-off of said first transistor permitting a capacitor to be charged, a second transistor being operatively connected to said capacitor so as to be turned on during the charging time of said capacitor, said second transistor being operatively connected to said incoming and outgoing amplifiers so as to disable said incoming amplifier and enable said outgoing amplifier when said second transistor is turned on.

10. A circuit for facilitating the remote controlled recording of a new announcement in a telephone answering device, comprising:

an announcement control record flip-flop comprising:

an operational amplifier having its output terminal connected to the inverting and non-inverting amplifier inputs respectively via first and second resistors, said first resistor having considerably higher resistance than said second resistor, said non-inverting input receiving a pulse in response to receipt by said answering device of a coded signal, thereby causing the output of said operational amplifier to assume a high state, a first transistor connected to be turned on when said operational amplifier output assumes said high state, one collector/emitter node of said first transistor being connected via a third resistor to a source of power, a second transistor connected between said non-inverting input and a power source return, a control line being connected via a first capacitor to the base of said second transistor so that a pulse on said control line will momentarily turn on said second transistor, thereby switching said operational amplifier output to a low state and turning off said first transistor, a third transistor connected between said control line and said power source return, said one collector/emitter node of said first transistor being connected to charge a second capacitor when said first transistor goes off, said second capacitor being operatively connected to turn on said third transistor and thereby clamp said control line to said power source return while said third transistor is charging, said control line being operatively connected to control the state of the recording and playback amplifiers in said telephone answering device, said control line and said one collector/emitter node being cooperatively connected to control the driving mechanism for the announcement and message tapes of said telephone answering device.

* * * * *